United States Patent
Yasui et al.

(10) Patent No.: US 8,664,286 B2
(45) Date of Patent: Mar. 4, 2014

(54) VIBRATION DAMPING COMPOSITION

(75) Inventors: Yoshihiko Yasui, Tokyo (JP); Hiroshi Suzuki, Tokyo (JP); Dai Nagaishi, Osaka (JP)

(73) Assignees: Nippon Shokubai Co., Ltd., Osaka (JP); Nihon Tokushu Toryo Co., Ltd., Osaka (JP)

( * ) Notice: Subject to any disclaimer, the term of this patent is extended or adjusted under 35 U.S.C. 154(b) by 521 days.

(21) Appl. No.: 12/067,329

(22) PCT Filed: Sep. 19, 2006

(86) PCT No.: PCT/JP2006/318897
§ 371 (c)(1), (2), (4) Date: Jun. 12, 2008

(87) PCT Pub. No.: WO2007/034933
PCT Pub. Date: Mar. 29, 2007

(65) Prior Publication Data
US 2009/0048357 A1    Feb. 19, 2009

(30) Foreign Application Priority Data
Sep. 20, 2005 (JP) .................................. 2005-272602

(51) Int. Cl.
C08J 9/28    (2006.01)

(52) U.S. Cl.
USPC ............... 521/70; 521/75; 521/134; 521/138; 521/139; 523/201; 524/458

(58) Field of Classification Search
USPC .............. 521/70, 75, 134, 138, 139; 523/201; 524/458
See application file for complete search history.

(56) References Cited

U.S. PATENT DOCUMENTS

| | | |
|---|---|---|
| 3,271,188 A | 9/1966 | Pfister et al. |
| 4,350,782 A | 9/1982 | Kuchler et al. |
| 4,385,139 A | 5/1983 | Kuchler et al. |
| 4,774,291 A | 9/1988 | Maeda |
| 4,900,774 A | 2/1990 | Mitsuji et al. |
| 4,916,171 A | 4/1990 | Brown et al. |
| 5,008,324 A | 4/1991 | Killgoar, Jr. et al. |
| 5,349,025 A | 9/1994 | Siol et al. |
| 5,356,956 A | 10/1994 | Uemae et al. |
| 5,403,623 A | 4/1995 | Kosters et al. |
| 5,670,006 A | 9/1997 | Wilfong et al. |
| 6,288,174 B1 | 9/2001 | Ikegami et al. |
| 6,559,193 B2 * | 5/2003 | Nonoyama et al. ............. 521/95 |
| 2001/0016612 A1 | 8/2001 | Kasai |
| 2002/0002211 A1 | 1/2002 | Nonoyama et al. |
| 2004/0072943 A1 | 4/2004 | Morihiro et al. |
| 2005/0101697 A1 | 5/2005 | Morihiro et al. |

FOREIGN PATENT DOCUMENTS

| | | |
|---|---|---|
| EP | 1 520 865 A2 | 4/2005 |
| JP | 5783547 | 5/1982 |
| JP | 61171776 | 8/1986 |
| JP | 05148446 | 6/1993 |
| JP | 07-062291 A | 3/1995 |
| JP | 07062291 | 3/1995 |
| JP | 10-316866 A | 12/1998 |
| JP | 10-316888 A | 12/1998 |
| JP | 10-324822 A | 12/1998 |
| JP | 10316866 | 12/1998 |
| JP | 10324822 | 12/1998 |
| JP | 2000-086939 A | 3/2000 |
| JP | 2000086939 | 3/2000 |
| JP | 2001152028 | 6/2001 |
| JP | 2004-115665 | 4/2004 |
| JP | 2004115665 | 4/2004 |
| JP | 2004137485 | 5/2004 |
| JP | 2005060712 | 3/2005 |
| JP | 2005-105106 A | 4/2005 |
| JP | 2005105106 | 4/2005 |
| JP | 2005105133 | 4/2005 |
| JP | 2005-126645 A | 5/2005 |
| JP | 2005126645 | 5/2005 |
| JP | 2005-154556 A | 6/2005 |
| JP | 2005-187514 A | 7/2005 |
| JP | 2005187514 | 7/2005 |
| JP | 2005187605 | 7/2005 |
| WO | WO-2007/055550 A1 | 5/2007 |

OTHER PUBLICATIONS

U.S. Appl. No. 11/507,504, filed Aug. 23, 2007, Miyawaki et al.
U.S. Appl. No. 11/507,506, filed Apr. 19, 2007, Miyawaki et al.
U.S. Appl. No. 11/507,528, filed Mar. 1, 2007, Miyawaki et al.
Extended European Search Report, European Application No. 06796642.4, dated Jul. 24, 2009.
Extended European Search Report, European Application No. 06798280.1, (dated Sep. 10, 2009).
Extended European Search Report, European Application No. 06796644.0, (dated Sep. 7, 2009).
Database WPI Week 199518, Thomson Scientific, London, GB; AN 1995-137544, XP002543145 & SU 1777337 A1 (Okhta Plastpolimer Res Prodn Assoc) Jul. 30, 1994, abstract.

* cited by examiner

*Primary Examiner* — John Cooney
(74) *Attorney, Agent, or Firm* — Novak Druce Connolly Bove + Quigg LLP

(57) ABSTRACT

To provide a vibration damping composition: excellent in vibration damping property and thermal drying property in a wide temperature range; and sufficiently suppressing sagging of a vibration damping coating film on the vertical surface; and therefore useful for vibration damping materials of various structures.

A vibration damping composition comprising an emulsion for vibration damping materials, a foaming agent, and an inorganic pigment, wherein the emulsion for vibration damping materials comprises a particle having a core part formed from an acrylic copolymer (A) and a shell part formed from an acrylic copolymer (B), and at least one of the acrylic copolymers (A) and (B) is prepared by copolymerizing a monomer component comprising methacrylic acid.

19 Claims, No Drawings

VIBRATION DAMPING COMPOSITION

RELATED APPLICATIONS

This application is a national stage application (under ±U.S.C. §371) of PCT/JP2006/318897 filed Sep. 19, 2006, which claims benefit of Japanese application 2005-272602 filed Sep. 20, 2005, disclosures of which are incorporated herein by reference.

TECHNICAL FIELD

The present invention relates to a vibration damping composition. More preferably, the present invention relates to a vibration damping composition useful as a raw material of vibration damping materials used to prevent vibration and noise of various structures, thereby to insure sustained quietude.

BACKGROUND ART

Vibration damping materials are used to prevent vibration and noise of various structures to insure sustained quietude and have been widely used beneath cabin floors of road vehicles and also applied to rolling stock, ships, aircraft, electric machines, buildings, and construction machines, among other uses. Molded products such as plate products and sheet products produced by using materials having vibration absorbing performance and sound absorbing performance have been conventionally used as raw materials used for such vibration damping materials. However, it is difficult for such molded products to be used at vibration or noise-generation positions having complicated shapes. Therefore, various methods for improving the workability and thereby sufficiently exhibiting the vibration damping property have been investigated. That is, an inorganic powder-containing asphalt sheet has been installed under automotive cabin flooring, for instance, but since the sheet must be secured in position by thermal fusion, improvements in workability and the like are needed and studies are underway on various compositions for vibration damping materials and polymers for the formation of vibration damping materials, for example.

Coating type vibration damping materials (coating materials) have been developed as an alternative material for such molded products. For example, the following vibration damping coating materials have been variously proposed: vibration damping coating materials are sprayed onto positions to be subjected to damping treatment with a spray or applied thereto by any methods, and thus-formed coating film can provide vibration absorbing effect. Specifically, not only aqueous vibration damping coating materials in which synthetic resin powders are blended with vehicles such as asphalt, rubber, and synthetic resin and thereby the hardness of the obtained coating film is improved, but also as materials suitably used for interior parts of cars, vibration coating materials in which activated carbon as a filler is dispersed into a resin emulsion, have been developed. However, even these conventional products do not provide sufficiently satisfactory vibration damping performances. Techniques for further sufficiently exhibiting the vibration damping performances have been desired.

With respect to conventional coating type vibration damping materials, disclosed is an aqueous vibration damping composition prepared by adding a compatibilizing agent to a mixture of aqueous dispersions of two or more kinds of polymers having different glass transition temperatures at a specific ratio (for example, referring to Japanese Kokai Publication No. 2001-152028 (page 2)). In this composition, the mixture of aqueous dispersions of incompatible polymers is used, and the compatibilizing agent is added to cover the incompatibility, and thereby the temperature peak of the vibration damping property can be broad. However, in such a composition, the compatibilizing agent may remain in the vibration damping coating film. Therefore, such a composition has room for improvement in order to sufficiently exhibit the vibration damping performances.

With respect to an emulsion for vibration damping materials containing particles having a core part formed from an acrylic copolymer and a shell part formed from an acrylic copolymer, disclosed is a technique for adjusting glass transition temperatures of these acrylic copolymers (for example, referring to Japanese Kokai Publication No. 2005-105133 (page 2)). Such an emulsion for vibration damping materials shows excellent vibration damping property in a wide temperature range. Therefore, such a technique is industrially very useful. However, such a technique has room for improvement in order that such an emulsion exhibits more excellent vibration damping performances and thereby is more preferably used as vibration damping materials of various structures.

SUMMARY OF THE INVENTION

The present invention has been made in view of the above-mentioned state of the art. The present invention has an object to provide a vibration damping composition: excellent in vibration damping property in a wide temperature range and thermal drying property; and sufficiently suppressing sagging of a vibration damping coating film on the vertical surface; and therefore useful for vibration damping materials of various structures.

The present inventors have made various investigations about vibration damping compositions. The inventors noted that if a vibration damping composition contains an emulsion for vibration damping materials containing a particle having a core part formed from an acrylic copolymer and a shell part formed from an acrylic copolymer, such a vibration damping composition can exhibit excellent vibration damping property in a wide temperature range, as compared with compositions prepared by using an acrylic copolymer singly or using two or more species of acrylic copolymers in combination. The inventors found that if at least one of such acrylic copolymers constituting the core part and the shell part is prepared using methacrylic acid, the methacrylic acid is uniformly polymerized into a copolymer by emulsion polymerization and interaction between the molecular chains improves, and thereby cohesion in the copolymer increases, leading to significant improvement in vibration damping property. The inventors also found that if such an emulsion for vibration damping materials further contains a foaming agent and an inorganic pigment, the vibration damping coating film has an uniform foaming structure and becomes a thick film, and thereby sufficient thermal drying property or high vibration damping property is exhibited, and also found that the composition is excellent in film-forming property after applied at low temperatures. Thereby, the above-mentioned problems have been admirably solved, and therefore the present invention has been completed.

The vibration damping composition of the present invention can be particularly preferably used for aqueous coating type vibration damping materials.

That is, the present invention is a vibration damping composition comprising an emulsion for vibration damping materials, a foaming agent, and an inorganic pigment, wherein the emulsion for vibration damping materials comprises a particle having a core part formed from an acrylic copolymer (A) and a shell part formed from an acrylic copolymer (B), and at least one of the acrylic copolymers (A) and (B) is prepared by copolymerizing a monomer component comprising methacrylic acid.

DETAILED DESCRIPTION OF THE INVENTION

The present invention is described in more detail below.

The vibration damping composition of the present invention contains an emulsion for vibration damping materials, a foaming agent, and an inorganic pigment. In each of these components, one or two or more species may be used. The vibration damping composition may further contain another component unless functional effects of the present invention are sacrificed.

In such a vibration damping composition, the emulsion for vibration damping materials contains particles having a core part and a shell part (hereinafter, also referred to as "core-shell type particle"). Such particles generally exist in the form in which they are dispersed in a medium. That is, it is preferable that the emulsion for vibration damping materials has a medium and core-shell type particles dispersed in the medium. The medium is preferably an aqueous medium. Examples of such an aqueous medium include water and mixed solvents of water and a solvent capable of mixing with water. Among them, water is preferred in view of influence on environment or safety, which may be caused by use of a coating material prepared by using the vibration damping composition of the present invention.

In the above-mentioned emulsion for vibration damping materials, the proportion of the core-shell type particles is 70% by weight or less, relative to 100% by weight of the total amount of the emulsion for vibration damping materials. If the proportion is more than 70% by weight, the viscosity of the emulsion for vibration damping materials becomes too high, and thereby, the emulsion may not maintain sufficient dispersion stability and then aggregate. The proportion is more preferably 60% by weight or less.

The above-mentioned core-shell type particle is a particle having a core part formed from an acrylic copolymer (A) and a shell part formed from an acrylic copolymer (B). Such a particle has a structure in which the acrylic copolymer (A) forming the core part and the acrylic copolymer (B) forming the shell part are combined. Representative examples of such a combined structure include a structure in which the acrylic copolymers (A) and (B) are completely compatible with each other (homogeneous structure), and a structure in homogeneously formed, in which the acrylic copolymers (A) and (B) are not completely compatible with each other (core-shell combined structure and microdomain structure). It is preferable that the core-shell type particle has the latter core-shell combined structure in order that the properties of both the acrylic copolymers are sufficiently exhibited and a stable emulsion is prepared.

The above-mentioned core-shell combined structure has a form in which the surface of the core part is covered with the shell part. It is preferable that the surface of the core part is perfectly covered with the shell part, in this case. However, the surface of the core part may not be perfectly covered. For example, the core-shell combined structure may have a form in which the surface of the core part is covered in a mesh-like state or a form in which the core part is not covered in some places.

The average particle diameter of the above-mentioned core-shell type particle is not especially limited and preferably 10 nm to 1 μm. If the average particle diameter is less than 10 nm, the viscosity of the emulsion for vibration damping materials may become too high or the emulsion for vibration damping materials may not maintain sufficient dispersion stability and then aggregate. If the average particle diameter is more than 1 μm, such an emulsion is no longer an emulsion. The average particle diameter is more preferably 20 to 500 nm.

The average particle diameter can be measured by the following procedures, for example. The emulsion is diluted with distilled water and then sufficiently stirred and mixed. Then, about 10 mL of the mixture is charged into a glass cell and subjected to measurement using a dynamic light scattering photometer NICOMP 380 (product of Particle Sizing Systems Inc.).

In the above-mentioned core-shell type particle, two species of acrylic copolymers, that is, the acrylic copolymer (A) and the acrylic copolymer (B) different from the acrylic copolymer (A) are used. These copolymers are different in any of various properties such as glass transition temperature, SP value (solubility coefficient), kind of monomer to be used, and proportion of the monomer. Among them, it is preferable that the copolymer (A) and (B) are different in at least one of the glass transition temperature and the SP value, as mentioned below.

It is preferable that the above-mentioned acrylic copolymer (A) constituting the core part has a glass transition temperature (TgA) higher than a glass transition temperature (TgB) of the above-mentioned acrylic copolymer (B). Such difference in glass transition temperature (Tg) makes it possible for the vibration damping composition to exhibit higher vibration damping property in a wide temperature range. The difference between TgA and TgB is more preferably 15° C. or more. Thereby, the vibration damping property can be efficiently exhibited particularly in a practical range of 20 to 60° C. If the difference is less than 15° C., the vibration damping property may be insufficiently exhibited at either 20° C. or 60° C. The difference is still more preferably 20° C. or more, and particularly preferably 25° C. or more. The vibration damping property within the practical range may be insufficient if the difference is too large. Therefore, the difference between TgA and TgB is preferably 100° C. or less, and more preferably 90° C. or less, and still more preferably 80° C. or less.

The glass transition temperature (TgA) of the above-mentioned acrylic copolymer (A) is preferably 0° C. or more, specifically. Thereby, a vibration damping coating film formed by using a coating material containing the vibration damping composition of the present invention has more excellent drying property, and therefore expansion or cracks on the surface of the coating film can be more sufficiently suppressed. That is, a vibration damping material having dramatically excellent vibration damping property is formed. The glass transition temperature (TgA) of the acrylic copolymer (A) is more preferably 5° C. or more.

As mentioned above, the preferable embodiments of the present invention include an embodiment in which the glass transition temperature (TgA) of the above-mentioned acrylic copolymer (A) is 0° C. or more and higher than the glass transition temperature (TgB) of the above-mentioned acrylic copolymer (B), and the difference between TgA and TgB is 15° C. or more.

The Tg of the acrylic copolymers may be determined based on already acquired knowledge, and also may be controlled by the kind or proportion of the monomer component. However, the Tg can be calculated through the following calculation formula, theoretically.

$$\frac{1}{Tg'} = \left[\frac{W_1'}{T_1} + \frac{W_2'}{T_2} + \ldots + \frac{W_n'}{T_n}\right]$$ [Equation 1]

in the formula, Tg' representing Tg of the acrylic copolymer (absolute temperature);

$W_1'$, $W_2'$, and . . . $W_n'$ each representing a mass fraction of each monomer to all the monomer component; and $T_1$, $T_2$, and . . . $T_n$ each representing a glass transition temperature (absolute temperature) of a homopolymer prepared by each monomer component.

It is also preferable that the above-mentioned acrylic copolymer (A) constituting the core part has a SP value smaller than that of the above-mentioned acrylic copolymer (B). Such difference in SP value makes it possible for the vibration damping composition to exhibit higher vibration damping property in a wide temperature range. The difference in SP value between the above-mentioned acrylic copolymers (A) and (B) is more preferably 0.2 or more, and still more preferably 0.35 or more. Further, the difference is preferably 2.0 or less.

The SP values (δ) of the acrylic copolymers can be measured based on the following Small formula, for example.

$$\delta = [(\Sigma \Delta e_1)(x)/(\Sigma \Delta V_m)(x)]^{0.5}$$ [Equation 2]

in the formula,

δ representing a SP value of the acrylic copolymer;

$\Delta_{el}$ representing a calculated value (kcal/mol) of evaporation energy of each monomer component constituting the acrylic copolymer;

$\Sigma \Delta_{el}$ representing a total value of the calculated values of all the monomer components constituting the acrylic copolymers;

$\Delta V_m$ being a calculated value (ml/mol) of molecular volume of each monomer component constituting the acrylic copolymer;

$\Sigma \Delta V_m$ being a total value of the calculated values of all the monomer components constituting the acrylic copolymer; and x being a molar distribution of each monomer component constituting the acrylic copolymer.

In the above-mentioned core-shell type particle, the ratio by weight of the acrylic copolymer (A) to the acrylic copolymer (B) ((A)/(B))) is preferably 10 to 70/30 to 90, for example. If the ratio of the acrylic copolymer (A) constituting the core part is smaller than the above-mentioned range, generation of blister (expansion of the coating film) after drying by heating may be insufficiently suppressed. In contrast, if the ratio of the acrylic copolymer (A) is larger than the above-mentioned range, generation of crack after heating by drying may be insufficiently suppressed. The ratio by weight is more preferably 30 to 60/40 to 70.

Then, the monomer components used for preparing the above-mentioned acrylic copolymers (A) and (B) are further explained. The same kind of monomers may be used as long as the acrylic copolymers (A) and (B) are different in the above-mentioned respects.

It is preferable that at least one of the above-mentioned acrylic copolymers (A) and (B) comprises methacrylic acid as a monomer component. Thereby, methacrylic acid is uniformly polymerized into a copolymer by emulsion polymerization interaction between the molecular chains, and thereby cohesion in the copolymer increases, leading to significant improvement in vibration damping property. It is more preferable that both of the above-mentioned acrylic copolymers (A) and (B) comprise methacrylic acid as a monomer component.

In the acrylic copolymer prepared by using a monomer component containing methacrylic acid, the proportion of methacrylic acid is preferably 0.1% by weight or more, relative to 100% by weight of the total amount of the monomer component used for preparing the acrylic copolymer, for example. If the proportion of methacrylic acid is less than 0.1% by weight, the vibration damping property may be insufficiently exhibited. The proportion is more preferably 0.3% by weight or more and still more preferably 0.5% by weight or more. Also, the proportion is preferably 20% by weight or less.

The above-mentioned monomer component may further contain another monomer other than methacrylic acid. Examples of another monomer include (meth)acrylic acid (salt) monomers such as acrylic acid, crotonic acid, citraconic acid, itaconic acid, maleic acid, maleic anhydride, fumaric acid, methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, pentyl acrylate, pentyl methacrylate, isoamyl acrylate, isoamyl methacrylate, hexyl acrylate, hexyl methacrylate, cyclohexyl acrylate, cyclohexyl methacrylate, octylacrylate, octylmethacrylate, isooctylacrylate, isooctyl methacrylate, nonyl acrylate, nonyl methacrylate, isononyl acrylate, isononyl methacrylate, decyl acrylate, decyl methacrylate, dodecyl acrylate, dodecyl methacrylate, tridecyl acrylate, tridecyl methacrylate, hexadecyl acrylate, hexadecyl methacrylate, octadecyl acrylate, octadecyl methacrylate, 2-ethylhexyl acrylate, 2-ethylhexyl methacrylate, vinyl formate, vinyl acetate, vinyl propionate, 2-hydroxyethyl acrylate, hydroxyethyl methacrylate, 2-hydroxypropyl acrylate, 2-hydroxypropyl methacrylate, diallyl phthalate, triallyl cyanurate, ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, diethylene glycol diacrylate, diethylene glycol dimethacrylate, allyl acrylate, allyl methacrylate, and salts thereof or esterified products thereof. One or two or more species of them may be used.

The above-mentioned salts are preferably metal salts, ammonium salts, organic amine salts, and the like. Examples of a metal atom forming the metal salts include monovalent metal atoms such as alkali metal atoms such as lithium, sodium, and potassium; divalent metal atoms such as alkaline earth metal atoms such as calcium and magnesium; and trivalent metal atoms such as aluminum and iron. Preferred examples of the organic amine salts include alkanolamines such as ethanolamine, diethanolamine, and triethanolamine, and triethylamines.

In the above-mentioned acrylic copolymer (A), the proportion of the above-mentioned (meth)acrylic acid (salt) monomer is preferably 10 to 100% by weight relative to 100% by weight of the total monomer component used in the acrylic copolymer (A), for example. The proportion is more preferably 30 to 80% by weight. In the above-mentioned acrylic copolymer (B), the proportion of the above-mentioned (meth) acrylic acid (salt) monomer is preferably 10 to 100% by weight relative to 100% by weight of the total monomer component used in the acrylic copolymer (B). The proportion is more preferably 50 to 100% by weight.

The proportion of the methacrylic acid is not included in "proportion of the (meth)acrylic acid (salt) monomer". The value represented by "% by weight" is an average value of the total particle contained in the emulsion for vibration damping materials.

The above-mentioned monomer component may further contain another monomer copolymerizable with methacrylic acid or the above-mentioned (meth)acrylic acid (salt) monomer. Examples of another monomer include styrene, divinylbenzene, α-methyl styrene, vinyltoluene, ethyl vinylbenzene, acrylonitrile, acrylamide, methacrylamide, diacetone acrylamide, N-methylolacrylamide, and N-methylolmethacrylamide.

The proportion of the above-mentioned another monomer is preferably 50% by weight or less, and more preferably 30% by weight or less, relative to 100% by weight of the total monomer component, for example.

The pH of the above-mentioned emulsion for vibration damping materials is not especially limited, and preferably 2 to 10, and more preferably 3 to 9, for example. The pH of the emulsion can be adjusted by adding ammonia water, water-soluble amines, alkali hydroxide aqueous solutions or the like, into the emulsion.

The viscosity of the above-mentioned emulsion for vibration damping materials is not especially limited. The viscosity is preferably 10 to 10000 mPa·s, and more preferably 50 to 5000 mPa·s. The viscosity can be measured under 25° C. and 20 rpm conditions with a B type rotational viscometer.

The above-mentioned emulsion for vibration damping materials is preferably produced by multistage polymerization using a usual emulsion polymerization method. The preferable embodiments of the present invention include an embodiment in which the above-mentioned emulsion for vibration damping materials is produced by multistage polymerization.

The present invention is also a production method of the above-mentioned emulsion for vibration damping materials, wherein the emulsion for vibration damping materials is produced by performing an emulsion polymerization step using monomer components having different glass transition temperatures in multiple stages.

In the above-mentioned production method of the emulsion for vibration damping materials, it is preferable that the emulsion for vibration damping materials is produced by performing an emulsion polymerization step using a monomer component constituting the core part formed from the acrylic copolymer (A) prior to a polymerization step using a monomer component constituting the shell part formed from the acrylic copolymer (B). For example, preferred is the production method of the above-mentioned emulsion for vibration damping materials, wherein an emulsion polymerization step using monomer components having different glass transition temperatures is performed in multiple stages, and an emulsion polymerization step in the first stage is a step of performing polymerization using the monomer component constituting the acrylic copolymer (A) and an emulsion polymerization step in the last stage is a step of performing polymerization using the monomer component constituting the acrylic copolymer (B).

The vibration damping composition can be preferably produced also by the above-mentioned production method. The preferable embodiments of the present invention also include the vibration damping composition, wherein the emulsion for vibration damping materials is produced by performing an emulsion polymerization step using monomer components having different glass transition temperatures in multiple stages. Further, the preferable embodiments of the present invention include the vibration damping composition, wherein the emulsion for vibration damping materials is produced by performing an emulsion polymerization step using a monomer component constituting the core part formed from the acrylic copolymer (A) prior to an emulsion polymerization step using a monomer component constituting the shell part formed from the acrylic copolymer (B).

As the above-mentioned production method, specifically, preferred is a method including the steps of (1) forming the core part formed from the acrylic copolymer (A) by emulsion polymerization of the monomer component in the aqueous medium, in the presence of a surfactant and/or a protective colloid, and (2) forming the shell part formed from the acrylic copolymer (B) by further emulsion polymerization of the monomer component into the emulsion containing the core part. Emulsions for vibration damping materials containing particles containing the core-shell combined structure can be preferably produced by such a production method. It is particularly preferable in the above-mentioned production method to adjust the compatibility of the acrylic copolymer (A) constituting the core part with the acrylic copolymer (B) constituting the shell part, the hydrophobic level (SP value) of these acrylic copolymers, the weight average molecular weight of these acrylic polymers, and the like. Thereby, ideal emulsions for vibration damping materials containing particles having core-shell structures can be produced.

According to the above-mentioned production method in the preferable embodiment, for example, the core part formed from the acrylic copolymer (A) is formed in the emulsion polymerization step using the monomer component constituting the core part formed from the acrylic copolymer (A), and the shell part formed from the acrylic copolymer (B) is formed so as to be exposed to the core part in the emulsion polymerization step using the monomer component constituting the shell part formed from the acrylic copolymer (B). Thereby, the emulsion for vibration damping materials can be more efficiently obtained. If the emulsion polymerization step is performed in three or more stages, the following embodiment is preferable. The emulsion polymerization step using the monomer component constituting the core part formed from the acrylic copolymer (A) is performed as the first stage, and the emulsion polymerization step using the monomer component constituting the shell part formed from the acrylic copolymer (B) is performed as the last stage. And other steps, that is, the emulsion polymerization step between the first stage and the last stage is not especially limited as long as the emulsion polymerization step is performed in the above-mentioned order.

Herein, the above-mentioned "monomer components having different glass transition temperatures" means monomer components satisfying the condition that homopolymers prepared using such monomer components have different glass transition temperatures (absolute temperatures).

The aqueous medium and the monomer component in the above-mentioned production method are as mentioned above.

The surfactant in the above-mentioned production method may be a surfactant generally used in the emulsion polymerization, and is not especially limited. Examples of such a surfactant include anionic surfactants, nonionic surfactants, cationic surfactants, amphoteric surfactants, polymer surfactants, and reactive surfactants. One or two or more species of them is/are preferably used.

The above-mentioned anionic surfactant is not especially limited. Examples of the anionic surfactant include alkyl sulfate salts such as sodium dodecyl sulfate, potassium dodecyl sulfate, and ammonium alkyl sulfate; sodium dodecyl polyglycol ether sulfate; sodium sulforicinoate; alkyl sulfonates such as sulfonated paraffin salt; alkyl sulfonates such as sodium dodecylbenzene sulfonate, and alkali metal sulfates of alkali phenol hydroxyethylene; higher alkyl naphthalene sulfonates; naphthalene sulfonic acid formalin condensate; fatty acid salts such as sodium laurate, triethanol amine oleate, and triethanol amine abietate; sulfuric esters of polyoxyalkyl ether; sulfuric esters of polyoxyethylene carboxylic acid ester; sulfuric esters of polyoxyethylene phenyl ether; sulfonic acid salts of succinic acid dialkyl esters; and polyoxyethylene alkylaryl sulfates. One or two or more species of them may be used.

The above-mentioned nonionic surfactant is not especially limited. Examples of the nonionic surfactant include polyoxyethylene alkyl ethers; polyoxyethylene alkylaryl ethers; sorbitan aliphatic esters; polyoxyethylene sorbitan aliphatic esters; aliphatic monoglycerides such as monolaurate of glycerol; polyoxyethylene-oxypropylene copolymer; condensates of ethylene oxide and aliphatic amines, aliphatic amides, or aliphatic acids. One or two or more species of them may be used.

The above-mentioned cationic surfactant is not especially limited. Examples of the cationic surfactant include dialkyl dimethyl ammonium salts, ester type dialkyl ammonium salts, amide type dialkyl ammonium salts, and dialkylimidazolium salts. One or two or more species of them may be used.

The above-mentioned amphoteric surfactant is not especially limited. Examples of the amphoteric surfactant include alkyl dimethylamino acetic acid betaine, alkyl dimethyl amine oxide, alkyl carboxy methyl hydroxyethyl imidazolinium betaine, alkyl amide propyl betaine, and alkyl hydroxy sulfobetaine. One or two or more species of them may be used.

The above-mentioned polymer surfactant is not especially limited. Examples of the polymer surfactant include polyvinyl alcohols and modified products thereof; (meth)acrylic acid water-soluble polymers; hydroxyethyl (meth)acrylic acid water-soluble polymers; hydroxypopyl (meth)acrylic acid water-soluble polymers; and polyvinyl pyrrolidone. One or two or more species of them may be used.

Among the above-mentioned surfactants, non-nonylphenyl type surfactants are preferably used in view of environment.

The use amount of the above-mentioned surfactant may be appropriately determined depending on the kind of the surfactant to be used or the kind of the monomer component to be used. For example, the use amount of the surfactant is preferably 0.3 to 10 parts by weight, and more preferably 0.5 to 5 parts by weight, relative to 100 parts by weight of the total amount of the monomer component used for preparing the acrylic copolymer.

Examples of the above-mentioned protective colloid include polyvinyl alcohols such as partially saponificated polyvinyl alcohols, completely saponificated polyvinyl alcohols, and modified polyvinyl alcohols; cellulose derivatives such as hydroxyethyl cellulose, hydroxypropylcellulose, and carboxymethylcellulose salt; natural polysaccharides such as Guar gum. One or two or more species of them may be used. Such a protective colloid may be used singly or in combination with the surfactant.

The use amount of the above-mentioned protective colloid may be appropriately determined depending on the use conditions and the like. For example, the use amount of the protective colloid is preferably 5 parts by weight or less, and more preferably 3 parts by weight or less, relative to 100 parts by weight of the total amount of the monomer component used for preparing the acrylic copolymer.

A polymerization initiator is preferably used in order to initiate the emulsion polymerization in the above-mentioned production method. The polymerization initiator is not especially limited as long as it is a substance which is decomposed by heating and generates radical molecules. Water-soluble initiators are preferably used. Examples of such an initiator include persulfates such as potassium persulfate, ammonium persulfate, and sodium persulfate; water-soluble azo compounds such as 2,2'-azobis(2-amidinopropane)dihydrochloride, and 4,4'-azobis(4-cyanopentanoic acid); thermal decomposition initiators such as hydrogen peroxide; redox polymerization initiators such as hydrogen peroxide and ascorbic acid, t-butyl hydroperoxide and rongalite, potassium per sulfate and metal salt, and ammonium persulfate and sodium hydrogensulfite. One or two or more species of them may be used.

The use amount of the above-mentioned polymerization initiator is not especially limited and may be appropriately determined depending on the kind of the polymerization initiator and the like. For example, the use amount of the polymerization initiator is preferably 0.1 to 2 parts by weight and more preferably 0.2 to 1 part by weight, relative to 100 parts by weight of the total amount of the monomer component used for preparing the acrylic copolymer.

A reducing agent may be used in combination with the above-mentioned polymerization initiator, if necessary, in order to accelerate the emulsion polymerization. Examples of the reducing agent include reducing organic compounds such as ascorbic acid, tartaric acid, citric acid, and grape sugar; and reducing inorganic compounds such as sodium thiosulfate, sodium sulfite, sodium bisulfite, and sodium metabisulfite. One or two or more species of them may be used.

The use amount of the above-mentioned reducing agent is not especially limited and preferably 0.05 to 1 part by weight, relative to 100 parts by weight of the total amount of the monomer component used for preparing the acrylic copolymer, for example.

It is also preferable in the above-mentioned production method to use a chain transfer agent if necessary at the time of the emulsion polymerization in order to adjust the average molecular weight of the above-mentioned acrylic copolymer (A) or (B). The chain transfer agent may be a generally used chain transfer agent and is not especially limited. Examples of the chain transfer agent include alkyl mercaptans such as hexyl mercaptan, octyl mercaptan, n-dodecyl mercaptan, t-dodecyl mercaptan, n-hexadecyl mercaptan, and n-tetradecyl mercaptan; halogenated hydrocarbons such as carbon tetrachloride, carbon tetrabromide, and ethylene bromide; mercaptocarboxylic acid alkyl esters such as 2-ethylhexyl mercaptoacetate, 2-ethylhexyl mercaptopropionate, and tridecyl mercaptopropionate; mercaptocarboxylic acid alkoxyalkyl esters such as methoxybutyl mercaptoacetate and methoxybutyl mercaptopropionate; carboxylic acid mercaptoalkyl esters such as 2-mercaptoethyl octanoate; α-methylstyrene dimer, terpinolene, α-terpinene, γ-terpinene, dipentene, anisole, and allyl alcohol. One or two or more species of them may be used. Among them, it is preferable to use an alkylmercaptans such as hexylmercaptan, octylmercaptan, n-dodecylmercaptan, t-dodecylmercaptan, n-hexadecylmercaptan, and n-tetradecylmercatan.

The use amount of the above-mentioned chain transfer agent is not especially limited and preferably 2 parts by weight or less, and more preferably 1.0 part by weight or less, relative to 100 parts by weight of the total amount of the monomer component used for preparing the acrylic copolymer, for example.

Regarding the emulsion polymerization conditions in the above-mentioned production method, the polymerization temperature is not especially limited and preferably 0 to 100° C. and more preferably 40 to 95° C., for example. The polymerization time is not especially limited, and preferably 1 to 15 hours, for example.

The addition mode of the monomer component, the polymerization initiator or the like is not especially limited. Any of en bloc addition, continuous addition, multistage addition and the like may be employed. These addition modes may be used in a suitable combination.

In the above-mentioned production method, the core part and the shell part are formed under the same operation, basically. The additives or the reaction conditions may be different, if necessary. For example, the surfactant and/or the protective colloid may not be added in the emulsion polymerization in the above-mentioned step (2).

The vibration damping composition of the present invention may generate blisters when drying of the coating film surface proceeds and residual moisture inside the coating film evaporates in the heat-drying step. In order to prevent this, a foaming agent foaming at the time of drying by heating is contained in the vibration damping composition and thereby residual moisture inside the coating film evaporates simultaneously with the foam formation. Thereby, such blisters are prevented. The thickness of the coating film increases because the vibration damping composition contains the foaming agent. Therefore, the vibration damping performances are also improved. Thus, the preferable embodiments of the present invention include the vibration damping composition comprising a foaming agent foaming during drying by heating.

The kind of the foaming agent is not especially limited in the above-mentioned vibration damping composition. Examples of the foaming agent include organic foaming agents such as diazoamino benzole, azoisobutyl nitrile, benzole sulfohydrazide, azodicarbonamide, P—P'-oxybenzole sulfohydrazide, benzyl monohydrazole; and thermal expansion microcapsules. Thermal expansion microcapsules are preferably used because they are excellent in stability in aqueous coating materials.

In the vibration damping composition of the present invention, the content of the foaming agent is not especially limited, and preferably 0.2 to 3.0 parts by weight relative to 100 parts by weight of the vibration damping composition.

The kind of the inorganic pigment is not especially limited in the vibration damping composition of the present invention. Used may be inorganic pigments such as calcium carbonate, kaolin, silica, talc, clay, barium sulfate, alumina, iron oxide, titanium oxide, glass powders, magnesium carbonate, aluminum hydroxide, bentonite, fly ash, and kieselguhr; flaky inorganic pigments such as glass flakes, pearlite, and mica; and filamentous inorganic pigments such as metal oxide whiskers, glass fibers. Particularly, flaky inorganic pigments have an effect of decreasing vibration energy by forming a layer structure inside the coating film. Therefore, mica having a high aspect ratio is preferably used. The use of such flaky inorganic pigments makes it possible to more sufficiently improve the vibration damping property. Thus, the preferable embodiments of the present invention include an embodiment in which the inorganic pigment comprises a flaky inorganic pigment. In this case, as the inorganic pigment, ordinarily used inorganic pigments such as calcium carbonate, kaolin, silica, and talc may be used in combination with such a flaky inorganic pigment.

The mix amount of the above-mentioned inorganic pigment is preferably 50 to 700 parts by weight, relative to 100 parts by weight of the emulsion for vibration damping materials, for example. That is, it is preferable that the vibration damping composition comprises 50 to 700 parts by weight of the inorganic pigment relative to 100 parts by weight of the emulsion for vibration damping materials. The vibration damping composition may insufficiently exhibit the thermal drying property or the vibration damping property if the inorganic pigment is less than 50 parts by weight. If the inorganic pigment is more than 700 parts by weight, cracks may be generated after drying by heating because of reduction in toughness of the coating film, or the coating film may be easily peeled from a substrate because of reduction in adhesion to the substrate. More preferably, the above-mentioned vibration damping composition contains 100 to 550 parts by weight of the inorganic pigment. Among them, it is preferable that 30 to 150 parts by weight of the flaky inorganic pigment is used, relative to 100 parts by weight of the emulsion for vibration damping materials. More preferably, 40 to 120 parts by weight of the flaky inorganic pigment is used.

The vibration damping composition of the present invention may contain other components other than the emulsion for vibration damping materials, the foaming agent, and the inorganic pigment, unless the functional effects of the present invention are sacrificed.

Examples of the above-mentioned other components include solvent; plasticizer; stabilizer; thickener; wetting agent; antiseptic; foaming inhibitor; organic pigment; glass bead; glass balloon; plastic bead; plastic balloon; antifreezing agent; dispersant; antifoaming agent; antioxidant; mildew-proofing agent; ultraviolet absorber; and antistatic agent. One or two or more species of them may be used. Among them, the vibration damping composition preferably contains a filler. The above-mentioned other components can be mixed with the above-mentioned emulsion for vibration damping materials and the like using, for example, a butterfly mixer, a planetary mixer, a spiral mixer, kneader, and a Dissolver.

The above-mentioned other components may be those generally used and are not especially limited. The following compounds and the like may be used, for example.

Examples of the above-mentioned solvent include ethylene glycol, butyl cellosolve, butyl carbitol, and butyl carbitol acetate. The mix amount of the solvent may be appropriately determined such that the solids concentration of the emulsion for vibration damping materials in the vibration damping composition is within the above-mentioned range.

Polyvinyl alcohols, cellulose derivatives, and polycarboxylic acid resins may be mentioned as the above-mentioned thickener, for example. The mix amount of the thickener is preferably, 0.01 to 4 parts by weight of solids, and more preferably 0.05 to 1.5 parts by weight, and still more preferably 0.1 to 1 part by weight, relative to 100 parts by weight of solids of the emulsion for vibration damping materials.

Hansa yellow, benzine yellow, copper phthalocyanine blue, quinacridone red may be mentioned as the above-mentioned organic pigment, for example.

Inorganic dispersants such as sodium hexametaphosphate and sodium tripolyphosphate and organic dispersants such as polycarboxylic acid dispersants may be mentioned as the above-mentioned dispersant, for example.

Ethylene glycol and propylene glycol may be mentioned as the above-mentioned antifreezing agent.

Silicone antifoaming agents may be mentioned as the above-mentioned antifoaming agent, for example.

Polyvalent metal compounds may be used as the above-mentioned other components. In this case, the polyvalent metal compound improves the stability, dispersibility, thermal drying property of the vibration damping composition or the vibration damping property of the vibration damping material formed by the vibration damping composition. The polyvalent metal compounds are not especially limited. Examples of the polyvalent metal compounds include zinc oxide, zinc chloride, and zinc sulfate. One or two or more species of them may be used.

The form of the above-mentioned polyvalent metal compound is not especially limited, and may be in the form of a fine particle, an aqueous dispersion, an emulsified dispersion, or the like. Among them, the polyvalent metal compound is preferably used in the form of an aqueous dispersion or an emulsified dispersion, and more preferably in the form of an emulsified dispersion because the dispersibility in the vibration damping composition is improved. The use amount of the polyvalent metal compound is preferably 0.05 to 5.0 parts by weight, and more preferably 0.05 to 3.5 parts by weight, relative to 100 parts by weight of solids in the vibration damping composition.

The production method of the vibration damping composition of the present invention is not especially limited as long as the composition contains the above-mentioned emulsion for vibration damping materials, foaming agent, inorganic material and, if necessary, other components. The vibration damping composition can be produced by mixing each of the components by a usual method.

The above-mentioned vibration damping composition is coated on a substrate and dried to give a coating film serving as a vibration damping material. The substrate is not especially limited. As the method of coating the substrate with the vibration damping composition, brush, roller, spatula, air spray gun, airless spray gun, mortar gun, texture gun, and the like, may be used for coating.

The coating amount of the above-mentioned vibration damping composition may be appropriately determined depending on the intended application, expected performance, and the like. The vibration damping composition is preferably coated such that the coating film at the time of (after) drying has a face weight of 1.0 to 7.0 kg/m$^2$, and more preferably 2.0 to 6.0 kg/m$^2$. Use of the emulsion for vibration damping materials of the present invention makes it possible to obtain a coating film which hardly generates expansion or cracks at the time of drying and hardly causes sagging on the vertical surface. Thus, the preferable embodiments of the present invention include a coating method of the vibration damping composition, wherein the vibration damping composition is coated so as to have a face weight of 2.0 to 6.0 kg/m$^2$ after drying, and dried. The preferable embodiments of the present invention also include a vibration damping material obtainable by the coating method of the vibration damping composition. Further, the preferable embodiments of the present invention include a use method of the vibration damping composition, wherein the vibration damping composition is used as an aqueous vibration damping material.

Regarding the conditions to be used in the case where the above-mentioned vibration damping composition is coated on the substrate and dried to form a coating film, either drying by heating or drying at atmospheric temperature may be adopted. However, from efficiency points of view, drying by heating is preferred and preferably employed because the vibration damping composition of the present invention has excellent thermal drying property. The temperature of the drying by heating is preferably 80 to 210° C., and more preferably 90 to 180° C., and still more preferably 120 to 170° C.

The application of the vibration damping composition of the present invention is not especially limited. The vibration damping composition can exhibit excellent thermal drying property, vibration damping property and the like, and therefore can be preferably used in such applications as rolling stock, ships, aircraft, electric machines, buildings and construction machines, in addition to as automotive cabin floor base.

The vibration damping composition of the present invention has the above-mentioned configuration. The vibration damping composition is particularly useful as a raw material used in vibration damping materials of various structures because it is excellent in vibration damping property and the thermal drying property in a wide temperature range and it can sufficiently suppress sagging on the vertical surface of the vibration damping coating film.

BEST MODE FOR CARRYING OUT THE INVENTION

The present invention is described in more detail with reference to Examples below, but the present invention is not limited to only these Examples. The terms, "part(s)" and "%" represent "part(s) by weight" and "% by weight", respectively, unless otherwise specified.

The SP value, the glass transition temperature (Tg), and the viscosity in the following Synthetic Examples and the like were determined by the above-mentioned procedures, respectively.

The white turbidity of the film was determined by the following procedures;

The obtained emulsion was charged into a mold in 50.00 mm (length)×100.00 mm (width)×2.00 mm (height) and left for 10 minutes at a room temperature. Then, the emulsion was baked at 140° C. to form a resin film. Thus-obtained resin film was visually observed for transparency.

Emulsion for Vibration Damping Materials

SYNTHETIC EXAMPLE 1

A polymerization container equipped with a stirrer, a reflux condenser, a thermometer, a nitrogen gas inlet pipe and a dropping funnel was filled with deionized water (76 parts). Then, under stirring in a nitrogen gas stream, the contents of the container were heated to an internal temperature of 70° C. The dropping funnel was filled with a monomer emulsion 1 composed of methyl methacrylate (22.8 parts), styrene (40.0 parts), 2-ethylhexylacrylate (22.5 parts), butylacrylate (12.2 parts), acrylic acid (2.0 parts), methacrylic acid (0.5 parts), previously adjusted 20% aqueous solution of polyoxyethylene alkyl ether sulfate ester salt (product of DAI-ICHI KOGYO SEIYAKU CO., LTD., "Hitenol NF-08") (15 parts), and deionized water (10 parts).

The monomer emulsion 1 was added dropwise into the polymerization container adjusted to 70° C., and thereby the reaction was allowed to proceed. The temperature was raised to 80° C., and the monomer emulsion 1 was uniformly added dropwise into the container over 2 hours while keeping the internal temperature at 80° C. At the same time, 5% aqueous solution of potassium persulfate (7 parts) and 2% aqueous solution of sodium hydrogensulfite (17.5 parts) were uniformly added dropwise into the container over 2 hours. Through such dropwise addition, an emulsion forming a core part was formed. After completion of the dropwise addition, the reaction was continued for 1 hour at 75° C. Thereby, each of the monomer components was completely consumed.

Thus-obtained emulsion forming the core part was measured for SP value, and the glass transition temperature (TgA)

was determined based on the formulation of the monomers constituting the core part. Table 1 shows these results.

Then, in another dropping funnel, prepared was a monomer emulsion 2 composed of methylmethacrylate (25.3 parts), styrene (10.0 parts), 2-ethylhexylacrylate (25.8 parts), butylacrylate (36.4 parts), acrylic acid (2.0 parts), methacrylic acid (0.5 parts), previously adjusted 20% aqueous solution of polyoxyethylene alkyl ether sulfate ester salt (product of DAI-ICH KOGYO SEIYAKU CO., LTD., "Hitenol NF-08") (15 parts), and deionized water (10 parts). The prepared monomer emulsion 2 was added dropwise into the emulsion forming the core part and thereby the reaction was allowed to proceed. The monomer emulsion 2 was added dropwise over 2 hours while keeping the internal temperature at 80° C. At the same time, 5% aqueous solution of potassium persulfate (7 parts) and 2% aqueous solution of sodium hydrogensulfite (17.5 parts) were uniformly added dropwise into the mixture over 2 hours. Through such dropwise addition, a shell part was formed to obtain a core-shell type particle. After completion of the dropwise addition, the reaction was continued for 1 hour at 75° C. Thereby, each of the monomers was completely consumed. Then, the reaction solution was cooled at 25° C., and a proper amount of 25% ammonia water was added into the reaction solution. Thereby, an emulsion for vibration damping materials was obtained.

The obtained emulsion for vibration damping materials was determined for solids concentration, pH and viscosity. And the white turbidity of the film was evaluated by visual observation. The SP value of the shell part was determined, and the glass transition temperature (TgB) was measured based on the formulation of the monomers constituting the shell part. Table 1 shows these results.

SYNTHETIC EXAMPLES 2 TO 5, COMPARATIVE SYNTHETIC EXAMPLES 1 AND 2

Emulsions for vibration damping materials were obtained in the same manner as in Synthetic Example 1, except that the formulations of the monomer components used for forming the core part and the shell part were changed as shown in Table 1 or 2.

These emulsions for vibration damping materials were evaluated for various physical properties and the like, as performed in Synthetic Example 1. Table 1 shows the results.

COMPARATIVE SYNTHETIC EXAMPLE 3

An emulsion for vibration damping materials was obtained in the same manner as in Synthetic Example 1, except that the formulation of the monomer components used for forming the core part was changed as shown in Table 1 and the shell part was not formed.

This emulsion for vibration damping materials was evaluated for various physical properties and the like, as performed in Synthetic Example 1. Table 1 shows results.

TABLE 1

|  |  | Synthetic Example ||||| Comparative Synthetic Example |||
|---|---|---|---|---|---|---|---|---|---|
|  |  | 1 | 2 | 3 | 4 | 5 | 1 | 2 | 3 |
| Core part (A) | MMA | 22.8 | 20.9 | 23.3 | 22.6 | — | 23.3 | — | 14.6 |
|  | St | 40.0 | 40.0 | 40.0 | 35.0 | 63.0 | 40.0 | 65.4 | 39.5 |
|  | 2EHA | 22.5 | 22.5 | 22.5 | 22.5 | 33.0 | 22.5 | 32.6 | 43.9 |
|  | BA | 12.2 | 12.6 | 12.2 | 12.9 | — | 12.2 | — | — |
|  | AA | 2.0 | 0.0 | 2.0 | 0.0 | 0.0 | 2.0 | 2.0 | 2.0 |
|  | MAA | 0.5 | 4.0 | 0.0 | 7.0 | 4.0 | 0.0 | 0.0 | — |
|  | SP value | 9.21 | 9.22 | 9.20 | 9.35 | 8.90 | 9.20 | 8.86 | 9.10 |
| Shell part (B) | MMA | 25.3 | 23.4 | 25.8 | 20.2 | 29.1 | 25.8 | 31.5 | — |
|  | St | 10.0 | 10.0 | 10.0 | 10.0 | — | 10.0 | — | — |
|  | 2EHA | 25.8 | 25.8 | 25.8 | 25.8 | — | 25.8 | — | — |
|  | BA | 36.4 | 36.8 | 36.8 | 37.0 | 66.9 | 36.4 | 66.5 | — |
|  | AA | 2.0 | 0.0 | 0.0 | 0.0 | 0.0 | 2.0 | 2.0 | — |
|  | MAA | 0.5 | 4.0 | 4.0 | 7.0 | 4.0 | 0.0 | 0.0 | — |
|  | SP value | 9.59 | 9.60 | 9.60 | 9.67 | 9.91 | 9.58 | 9.89 | — |
|  | TgA/TgB(° C.) | 20/−20 | 20/−20 | 20/−20 | 20/−20 | 20/−20 | 20/−20 | 20/−20 | 0 |
|  | Ratio of WA/WB | 50/50 | 50/50 | 50/50 | 50/50 | 50/50 | 50/50 | 50/50 | 100 |
|  | Δ SP(B − A) | 0.38 | 0.38 | 0.40 | 0.32 | 1.01 | 0.38 | 1.03 | — |
| Emulsion characteristics | Solids (% by weight) | 55.0 | 55.0 | 55.0 | 55.0 | 55.0 | 55.0 | 54.9 | 55.0 |
|  | PH | 7.7 | 7.7 | 7.7 | 7.7 | 7.7 | 7.7 | 7.6 | 7.5 |
|  | Viscosity (mPa · s) | 200 | 350 | 610 | 800 | 650 | 280 | 610 | 450 |
|  | White turbidity of film | Fluorescence | Fluorescence | Fluorescence | Fluorescence | White turbidity | Fluorescence | White turbidity | Transparency |

Descriptions in Table 1 are as follows.
MMA: methyl methacrylate
St: styrene
2EHA: 2-ethylhexyl acrylate
BA: butyl acrylate
EA: ethyl acrylate
AA: acrylic acid
TgA/TgB (° C.): glass transition temperature (° C.) of the core part (A)/glass transition temperature (° C.) of the shell part (B)
Ratio of WA/WB: ratio by weight (%/%) of the core part (A) to the shell part (B)
ΔSP (B − A): value calculated by subtracting the SP value of the core part (A) from the SP value of the shell part (B)

As ΔSP (B–A) becomes small, the compatibility becomes relatively more excellent. On the other hand, the compatibility becomes relatively more poor as ΔSP (B–A) becomes larger.

Vibration Damping Composition

EXAMPLES 1 TO 5, COMPARATIVE EXAMPLES 1 TO 2

Vibration damping compositions of Examples 1 to 5 and Comparative Examples 1 to 3 were obtained by preparing coating materials using the emulsions for vibration damping materials obtained in the above-mentioned Synthetic Examples and Comparative Synthetic Examples at formulations shown in Table 2.

Each of the obtained vibration damping composition was coated on a reed-shaped sheet steel in 30×300×1.6 mm with a spatula such that the weight after drying was 4 kg per $m^2$. Then, the coated composition was dried for 45 minutes at 140° C. Thereby, test pieces for vibration damping measurement were prepared.

Each of these test pieces for vibration damping measurement was measured for loss factor values at 20° C., 40° C., and 60° C. atmosphere. Table 3 shows the results. The loss factor value was calculated from half band width of each resonance point at 1 to 1000 Hz of mechanical impedance, based on midpoint excitation method. Then, the loss factor value at 200 Hz was determined by interpolation method. The larger the loss factor value is, the higher the effect of decreasing vibration damping energy is.

the emulsion for vibration damping materials not having a shell part (with a homogeneous particle structure).

The loss factor value was low and the vibration damping effect was low in each temperature range in Comparative Examples 1 and 2 using the emulsion for vibration damping materials not containing methacrylic acid.

EXAMPLE 6

The vibration damping composition obtained in Example 2 was coated on a reed-shaped sheet steel in 30×300×1.6 mm with a spatula such that the weight after drying was 1 kg per $m^2$ (the face weight after drying was 1.0 kg/$m^2$). Then, the coated composition was dried for 45 minutes at 140° C. Thereby, a testpiece for vibration damping measurement was prepared. Using this testpiece, the loss factor values at 20° C., 40° C., and 60° C. atmosphere were measured. Table 4 shows the results.

EXAMPLES 7 TO 10

The vibration damping compositions obtained in Example 2 were used and the loss factor values at 20° C., 40° C., and 60° C. atmosphere were measured in the same manner as in Example 6, except that each of the compositions was coated such that the face weight after drying showed a value described in Table 4. Table 4 shows the results.

TABLE 2

| | | Formulation (part by weight) | Remarks |
|---|---|---|---|
| Raw material | Emulsion for vibration damping materials | 45.0 | Emulsion |
| | Polycarboxylic acid ammonium salt | 0.5 | Dispersant |
| | Mineral oil based antifoaming agent | 0.2 | Antifoaming agent |
| | Propylene glycol | 1.0 | Antifreezing agent |
| | Calcium carbonate | 31.3 | Inorganic pigment |
| | Mica | 20.0 | Inorganic pigment |
| | Thermal expansion microcapsule | 0.5 | Foaming agent |
| | Polyacrylic acid ester | 1.5 | Thickener |
| | Total | 100.0 | |

TABLE 3

| | | Example | | | | | Comparative Example | | |
|---|---|---|---|---|---|---|---|---|---|
| | | 1 | 2 | 3 | 4 | 5 | 1 | 2 | 3 |
| Emulsion for vibration damping materials | | Synthetic Example 1 | Synthetic Example 2 | Synthetic Example 3 | Synthetic Example 4 | Synthetic Example 5 | Comparative Synthetic Example 1 | Comparative Synthetic Example 2 | Comparative Synthetic Example 3 |
| Vibration damping property (loss factor) | 20° C. | 0.084 | 0.095 | 0.107 | 0.079 | 0.102 | 0.084 | 0.090 | 0.045 |
| | 40° C. | 0.125 | 0.145 | 0.141 | 0.141 | 0.126 | 0.102 | 0.095 | 0.146 |
| | 60° C. | 0.082 | 0.087 | 0.077 | 0.104 | 0.097 | 0.074 | 0.077 | 0.019 |

High loss factor values were obtained in a wide temperature range in Examples 1 to 5 using the emulsions for vibration damping materials with a core-shell type structure prepared by copolymerizing methacrylic acid.

In contrast, the loss factor values at 20° C. and 60° C. were low and the temperature range where the vibration damping effect is exhibited is narrow in Comparative Example 3 using

TABLE 4

| | Face weight (kg/$m^2$) | Vibration damping property | | |
|---|---|---|---|---|
| | | 20° C. | 40° C. | 60° C. |
| Example 6 | 1.0 | 0.008 | 0.020 | 0.004 |
| Example 7 | 2.0 | 0.020 | 0.060 | 0.030 |

TABLE 4-continued

|  | Face weight | Vibration damping property | | |
|---|---|---|---|---|
|  | (kg/m²) | 20° C. | 40° C. | 60° C. |
| Example 8 | 4.0 | 0.095 | 0.145 | 0.087 |
| Example 9 | 6.0 | 0.195 | 0.252 | 0.209 |
| Example 10 | 7.5 | 0.166 | 0.142 | 0.079 |

In Example 6 in which the face weight after drying was 1.0 kg/m², the vibration damping property was the lowest. However, in Examples 7 to 9 in which the face weight after drying was 2.0 to 6.0 kg/m², the effect of the vibration damping property was observed. And the vibration damping property was the best in Example 9. In Example 10 in which the face weight after drying was 7.5 kg/m², the properties of the vibration damping composition were not sufficiently exhibited because the drying property was insufficient.

EXAMPLES 11 TO 15

Vibration compositions were obtained as performed in Example 2 and the loss factor values at 20° C., 40° C., and 60° C. atmosphere were measured in the same manner as in Example 2, except that the amounts of the calcium carbonate and mica were changed to amounts described in Table 5, respectively. Table 5 shows the results.

TABLE 5

|  |  | Example 11 | Example 12 | Example 13 | Example 14 | Example 15 |
|---|---|---|---|---|---|---|
| Inorganic pigment | Calcium carbonate (part by weight) | 31.3 | 31.3 | 0.0 | 20.0 | 0.0 |
|  | Mica (part by weight) | 20 | 0.0 | 20 | 10 | 51.3 |
| Vibration damping property | 20° C. | 0.095 | 0.045 | 0.12 | 0.102 | 0.295 |
|  | 40° C. | 0.145 | 0.076 | 0.152 | 0.121 | 0.543 |
|  | 60° C. | 0.087 | 0.035 | 0.045 | 0.061 | 0.351 |

The invention claimed is:

1. A vibration damping composition comprising an emulsion for vibration damping materials, a foaming agent, and an inorganic pigment,
wherein the emulsion for vibration damping materials comprises a particle having a core part formed from an acrylic copolymer (A) and a shell part formed from an acrylic copolymer (B), and
the acrylic copolymer (B) forming the shell part is prepared by copolymerizing a monomer component comprising methacrylic acid; wherein the amount of said methacrylic acid is 4% by weight or more and is 20% by weight or less, relative to 100% by weight of the total amount of the monomer component used for preparing the acrylic copolymer (B) comprising methacrylic acid, and wherein the inorganic pigment comprises a flaky inorganic pigment, wherein said flaky inorganic pigment is a pigment forming a layer structure inside a coating film formed from said vibration damping composition of which they are a part, and wherein said flaky inorganic pigment comprises mica, and the amount of the flaky inorganic pigment is 30 to 150 parts by weight relative to 100 parts by weight of the emulsion for vibration damping materials.

2. The vibration damping composition according to claim 1,
wherein the emulsion for vibration damping materials is produced by performing an emulsion polymerization step using monomer components having different glass transition temperatures in multiple stages.

3. The vibration damping composition according to claim 1,
wherein the emulsion for vibration damping materials is produced by performing an emulsion polymerization step using a monomer component constituting the core part formed from the acrylic copolymer (A) prior to an emulsion polymerization step using a monomer component constituting the shell part formed from the acrylic copolymer (B).

4. The vibration damping composition according to claim 1,
wherein the vibration damping composition comprises a foaming agent which foams during drying by heating.

5. The vibration damping composition according to claim 1,
wherein the vibration damping composition comprises 50 to 700 parts by weight of inorganic pigment relative to 100 parts by weight of the emulsion for vibration damping materials.

6. An aqueous vibration damping material which comprises the vibration damping composition of claim 1.

7. A method of coating a substrate which comprises coating the substrate with the vibration damping composition of claim 1, and then drying the vibration damping composition, wherein the vibration damping composition has a face weight of 1.0 to 7.0 kg/m² after drying.

8. A vibration damping material obtained by the coating method of claim 7.

9. The vibration damping composition according to claim 2,
wherein the emulsion for vibration damping materials is produced by performing an emulsion polymerization step using a monomer component constituting the core part formed from the acrylic copolymer (A) prior to an emulsion polymerization step using a monomer component constituting the shell part formed from the acrylic copolymer (B).

10. The vibration damping composition according to claim 2,
wherein the vibration damping composition comprises a foaming agent which foams during drying by heating.

11. The vibration damping composition according to claim 3,
wherein the vibration damping composition comprises a foaming agent which foams during drying by heating.

12. The vibration damping composition according to claim 2,
wherein the vibration damping composition comprises 50 to 700 parts by weight of inorganic pigment relative to 100 parts by weight of the emulsion for vibration damping materials.

13. The vibration damping composition according to claim 3,
wherein the vibration damping composition comprises 50 to 700 parts by weight of inorganic pigment relative to 100 parts by weight of the emulsion for vibration damping materials.

14. The vibration damping composition according to claim 4,
wherein the vibration damping composition comprises 50 to 700 parts by weight of inorganic pigment relative to 100 parts by weight of the emulsion for vibration damping materials.

15. A method of coating a substrate which comprises coating the substrate with the vibration damping composition of claim 2, and then drying the vibration damping composition, wherein the vibration damping composition has a face weight of 1.0 to 7.0 kg/m$^2$ after drying.

16. The vibration damping composition according to claim 1 wherein the acrylic copolymer (A) has a SP value smaller than that of the acrylic copolymer (B) and the difference in SP value between the acrylic copolymers (A) and (B) is 0.2 or more.

17. The vibration damping composition according to claim 1 wherein the acrylic copolymer (A) has a glass transition temperature (TgA) higher than a glass transition temperature (TgB) of the acrylic copolymer (B) and the difference between TgA and TgB is 15° C. or more.

18. The vibration damping composition according to claim 1, wherein the amount of the flaky inorganic pigment is 40 to 120 parts by weight relative to 100 parts by weight of the emulsion for vibration damping materials.

19. The vibration damping composition according to claim 1, wherein both of the acrylic copolymers (A) and (B) are prepared by copolymerizing a monomer component comprising methacrylic acid; wherein the amount of said methacrylic acid is 4% by weight or more and is 20% by weight or less, relative to 100% by weight of the total amount of the monomer component used for preparing the acrylic copolymer comprising methacrylic acid.

* * * * *

UNITED STATES PATENT AND TRADEMARK OFFICE
CERTIFICATE OF CORRECTION

PATENT NO. : 8,664,286 B2
APPLICATION NO. : 12/067329
DATED : March 4, 2014
INVENTOR(S) : Yoshihiko Yasui et al.

It is certified that error appears in the above-identified patent and that said Letters Patent is hereby corrected as shown below:

On the Title page, item (73):

Nihon Tokushu Toryo Co., Ltd., "Osaka" should read -- Tokyo --;

In the Claims:

Column 21, Claim 16, line 19, after "1", insert -- , --;

Column 22, Claim 17, line 5, after "1", insert -- , --; and

Column 22, Claim 17, line 8, after "15°C" remove ".".

Signed and Sealed this
Twenty-fourth Day of June, 2014

Michelle K. Lee
*Deputy Director of the United States Patent and Trademark Office*